(12) United States Patent
Caveney et al.

(10) Patent No.: US 9,113,236 B2
(45) Date of Patent: Aug. 18, 2015

(54) PHYSICAL LAYER MANAGEMENT USING RFID MODULES AND COMMON MODE SIGNALING

(75) Inventors: Jack E. Caveney, North Palm Beach, FL (US); Ronald A. Nordin, Naperville, IL (US); Masud Bolouri-Saransar, Orland Park, IL (US)

(73) Assignee: Panduit Corp., Tinley Park, IL (US)

( * ) Notice: Subject to any disclaimer, the term of this patent is extended or adjusted under 35 U.S.C. 154(b) by 571 days.

(21) Appl. No.: 13/254,105

(22) PCT Filed: Mar. 25, 2010

(86) PCT No.: PCT/US2010/028604
§ 371 (c)(1),
(2), (4) Date: Nov. 11, 2011

(87) PCT Pub. No.: WO2010/111456
PCT Pub. Date: Sep. 30, 2010

(65) Prior Publication Data
US 2012/0068830 A1    Mar. 22, 2012

Related U.S. Application Data

(60) Provisional application No. 61/163,286, filed on Mar. 25, 2009.

(51) Int. Cl.
*H04Q 5/22* (2006.01)
*H04Q 1/02* (2006.01)
*H01R 13/66* (2006.01)

(52) U.S. Cl.
CPC ........... *H04Q 1/138* (2013.01); *H01R 13/6683* (2013.01)

(58) Field of Classification Search
CPC ........................... H01R 13/6683; H04Q 1/138
See application file for complete search history.

(56) References Cited

U.S. PATENT DOCUMENTS

| | | | | |
|---|---|---|---|---|
| 2006/0237217 A1* | 10/2006 | Glew | ..................... | 174/113 C |
| 2006/0237219 A1* | 10/2006 | Glew | ..................... | 174/113 C |
| 2007/0205873 A1* | 9/2007 | Mickle et al. | ............... | 340/10.33 |
| 2008/0122579 A1 | 5/2008 | German et al. | | |

(Continued)

FOREIGN PATENT DOCUMENTS

| | | |
|---|---|---|
| EP | 1796403 A2 | 6/2007 |
| JP | 2007221761 A | 8/2007 |

(Continued)

*Primary Examiner* — Steven Lim
*Assistant Examiner* — Omeed Alizada
(74) *Attorney, Agent, or Firm* — Christopher S. Clancy; Christopher K. Marlow

(57) ABSTRACT

An intelligent network patch field management system is provided that includes active electronic hardware, firmware, mechanical assemblies, cables, and software that guide, monitor, and report on the process of connecting and disconnecting patch cords plugs in an interconnect or cross-connect patching environment. RFID tag integrated chips are used in some embodiments of the system to allow for detection of patch cord insertion and removal at switch ports. RFID tags may also be used to detect users and control access to the network based on the users' levels of authorization. Network access can also be controlled at the outlet jack level. The system is capable of monitoring patch cord connections to detect insertions or removals of patch cords or plugs. In addition, the system can map entire networks.

15 Claims, 11 Drawing Sheets

(56) References Cited

U.S. PATENT DOCUMENTS

2008/0253556 A1* 10/2008 Cobb et al. .................. 379/442
2009/0166404 A1 7/2009 German et al.

FOREIGN PATENT DOCUMENTS

| JP | 2008017370 A | 1/2008 |
|---|---|---|
| WO | 2006075247 A1 | 7/2006 |

\* cited by examiner

PHYSICAL LAYER MANAGEMENT USING RFID MODULES AND COMMON MODE SIGNALING

TECHNICAL FIELD

The present application relates to network physical layer management systems, and more particularly to a system incorporating radio frequency identification (RFID) modules and a common mode signaling system for communicating with the RFID modules.

BACKGROUND

Communications networks are growing in number and complexity, and are continually being interconnected to satisfy customers' needs. Patch panels are used in communications networks as intermediate elements between horizontal cabling (to which endpoint devices such as computers and telephones are connected) and network switches. Specifically a patch panel includes a panel of network ports that connect incoming and outgoing lines of a local area network (LAN) or other communication system. In a LAN, for example, the patch panel connects the network's computers to switches or routers that enable the LAN to connect to the Internet or another wide area network (WAN). Connections are made with patch cords. The patch panel allows connections to be arranged and rearranged by plugging and unplugging the patch cords.

When physical connections between endpoint devices and network switches are added, moved or removed, patch panels are the points at which technicians complete the required installations or removals of patch cords within patch fields. Patch panels offer the convenience of allowing technicians to quickly change the path of selected signals.

It is important to maintain a record of changes that are made to patch cord connections within the patch field. Proper documentation of changes in the patch field assures that the routing of patch cords is always known and further assures that any future changes are completed correctly.

Human error associated with the implementation and maintenance of physical cable connections between network communication equipment can result in significant negative impact to a network. Such negative impact can be avoided through improved control and verification of network cable installation and removal work orders implemented by network technicians.

In addition, it is desirable to combine the functions of a patch cord management system with additional physical layer management techniques that could, for example, extend the scope of management from a network switch port, through a patch field, and to an outlet where, for example, end-user devices can be connected. Further, in copper-based networks, it is desirable to have such a system that utilizes existing four-pair Ethernet cable for both data connectivity and network management functions.

SUMMARY

In some embodiments of the present invention, systems for guiding patch cord installations and removals in a network are provided. Signals relevant to physical layer management are placed on Ethernet cables in a common-mode technique that does not interfere with the standard differential mode Ethernet signaling used to carry data on the network. The common-mode management signals are used to communicate with RFID tags and transceivers that can be provided within plugs of patch cords or within jacks, such as outlet jacks.

In some embodiments, RFID tags are provided on a mounting bar attached to the face of an Ethernet switch. The RFID tags can communicate with RFID antennas provided in specialized patch cords and can be used to identify associated switch ports.

These and other aspects of the present invention are explained to those of ordinary skill in the art in the following detailed description, with reference to the drawings. It should be understood that the embodiments noted herein are not intended to limit the scope of the invention.

DETAILED DESCRIPTION

Figure 1:
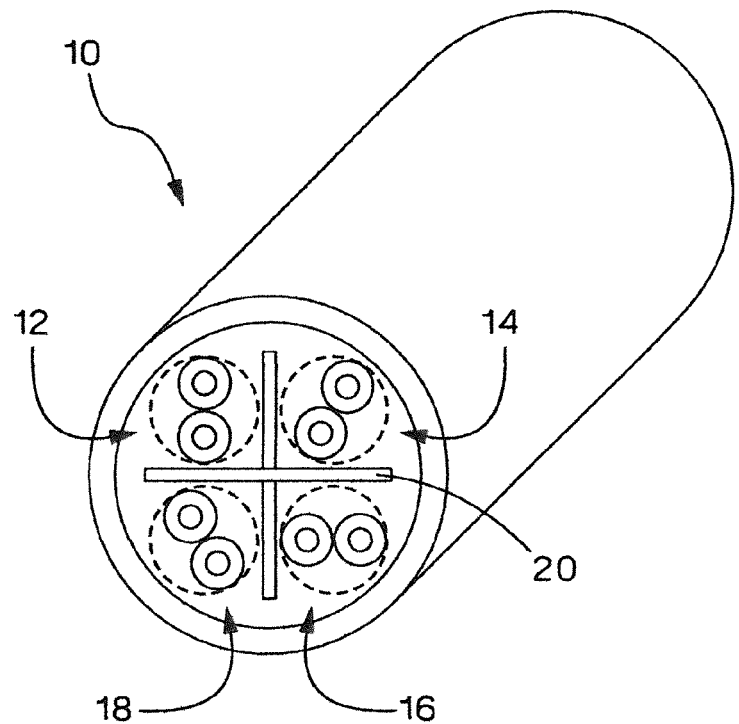
FIG. 1 is a perspective view of a four-pair Ethernet cable.

The present application provides a system that uses the properties of Ethernet copper cabling to allow management signals to be combined with standard Ethernet data signaling without affecting the Ethernet data signaling and without requiring customized patch cords, such as patch cords that employ additional conductors for management signaling. FIG. 1 is a cross-sectional view of a standard four-pair Ethernet cable 10. The cable 10 contains first, second, third, and fourth twisted pairs of conductors; 12, 14, 16, and 18, respectively. The twisted pairs may be separated from one another by a pair separator 20. The twisted pairs are generally provided in a cable core that itself twists along the length of the cable.

Figure 2:
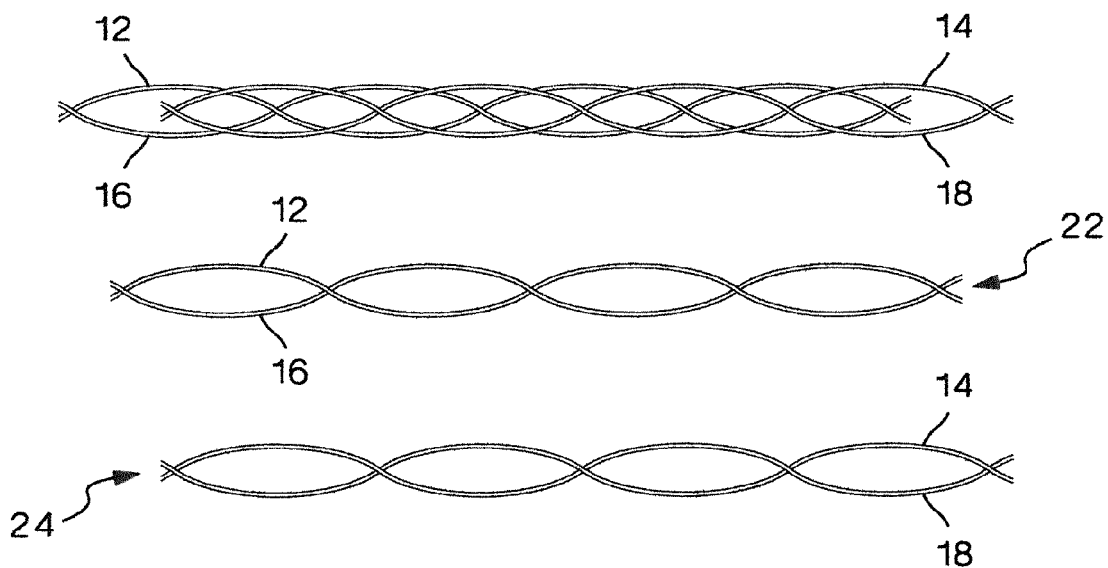
FIG. 2 is an illustration of twisted pairs arranged within an Ethernet cable.

FIG. 2 is a graphical depiction of the twisted pairs as they lie within a cable, with a depiction of "super-pairs" 22 and 24, each comprised of two twisted pairs of conductors. Systems according to the present system use super-pairs to enable management communications that do not interfere with standard Ethernet data signaling. It is preferred to use diagonally opposed twisted pairs as super-pairs 22 and 24, due to the better electrical balance that results. For example, a first super-pair 22 is preferably comprised of the first and third twisted pairs 12 and 16; and a second super-pair 24 is preferably comprised of the second and fourth twisted pairs 14 and 18.

While standard Ethernet data signaling is accomplished using differential-mode signaling along the twisted pairs, systems according to the present invention use common-mode signaling across twisted pairs of the Ethernet cable to send management signals along Ethernet cables without interfering with the standard Ethernet data signaling.

Figure 3:
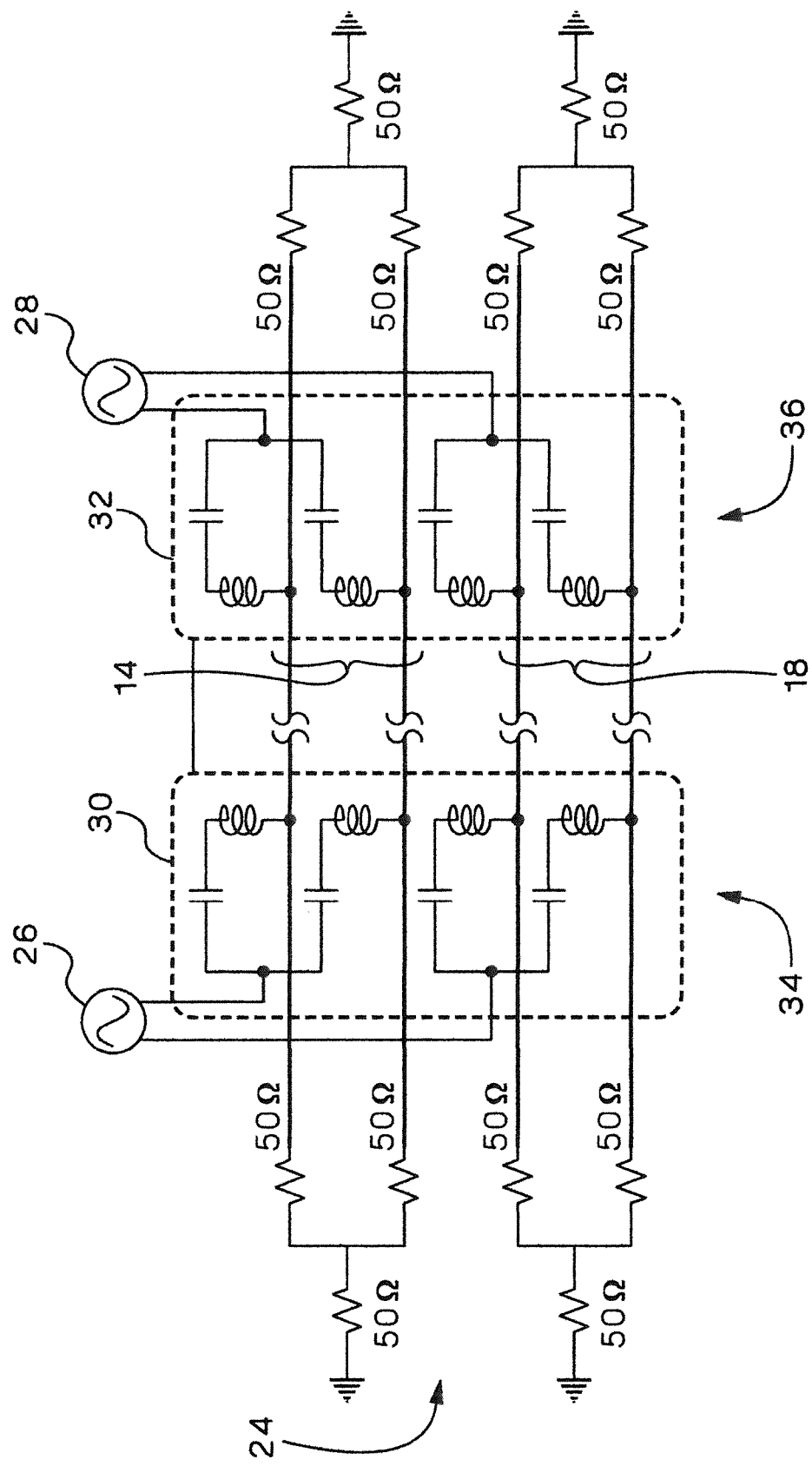
FIG. 3 is a schematic diagram of a common mode signaling technique employing two twisted pairs of an Ethernet link.

In one embodiment, the common-mode signaling is imposed onto the conductors of at least one super-pair as shown in FIG. 3. In the embodiment shown in FIG. 3, twisted pairs 14 and 18 are combined into a super-pair 24 that is used to carry management signals. First and second common-mode transceivers 26 and 28 are used to send or receive common mode signals over the super-pair 24 via first and second common-mode coupling circuitry assemblies 30 and 32, respectively.

A bi-directional common-mode communications channel can use a variety of transmission frequencies (e.g., 150 kHz), and the information can be transmitted via a number of modulation techniques, including termination impedance modulation. Termination impedance modulation is a preferred modulation technique because RFID tag integrated chips (IC's) make use of this mechanism and the cost of the electronics is very low. In this modulation technique, the endpoint receiver (i.e., an RFID tag IC) switches a load resistor across the receiving coil (sometimes referred to as the receiving antenna) thereby changing the termination impedance. The transmitter (e.g., an RFID reader) can detect this impedance change by sensing a voltage change within its circuitry. This technique is a way of forming a communication channel between the endpoint receiver and the transmitter, hence forming a bidirectional communication channel. Termination impedance modulation is also referred to in the RFID industry as "load modulation" or "inductive coupling modulation."

Figure 4A:
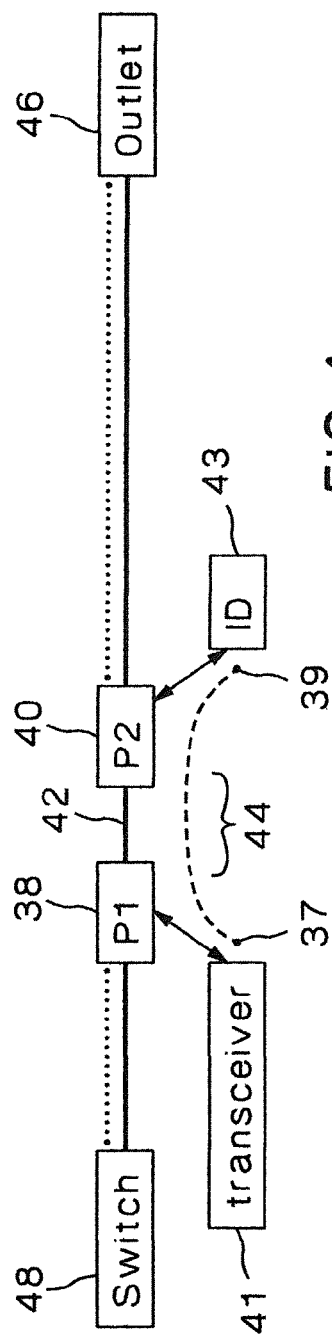
FIGS. 4a-4c are block diagrams of embodiments of the present invention for use with cross-connect patch panel deployments.
Figure 4B:
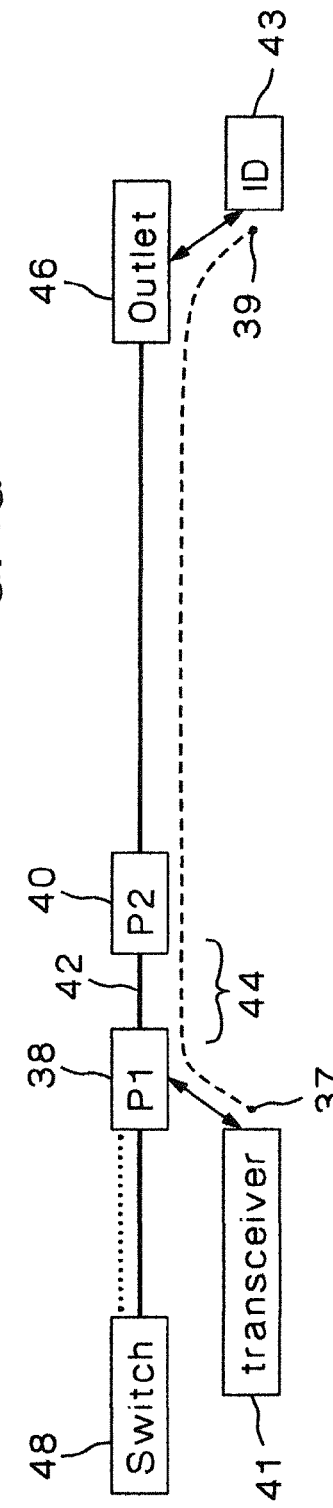
Figure 4C:
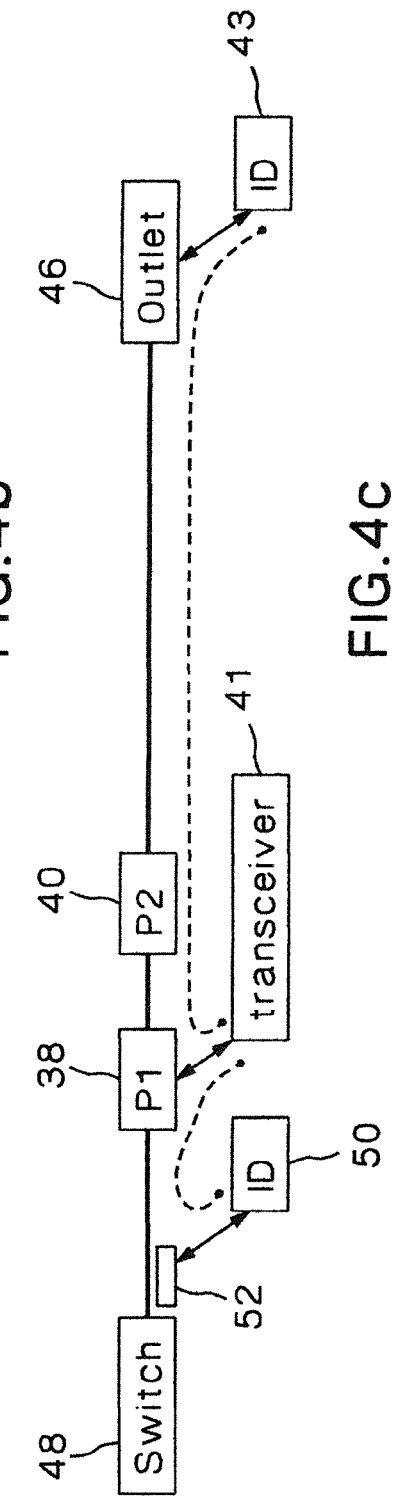

FIGS. 4a-4c show three implementations of cross-connect systems according to different embodiments of the present invention. FIGS. 4a-4c and 5a-5c each show one communications link from a network switch to an outlet jack, though it is to be understood that patch panels and systems according to the present invention can support many such links.

The first implementation, shown in FIG. 4a, uses two common-mode signaling nodes. A first common mode signaling node 37 is an RFID transceiver 41 that is placed in the first patch panel 38. A second common mode signaling node 39 is an RFID tag IC 43 that is located in the second patch panel 40. A standard Ethernet patch cord 42 is connected between the two patch panels in a patch field 44, though specialized patch cords provided with LEDs for guiding a technician can be provided in some embodiments. The embodiment of FIG. 4a assumes that the connectivity between the network switch 48 and the first patch panel 38 does not change, and neither does the connectivity between the second patch panel 40 and the outlet jack 46. This is represented by the dotted lines in FIG. 4a.

One implementation for this system is as shown in FIG. 4a, with an RFID transceiver 41 provided in one patch panel and an RFID tag IC 43 provided in a second patch panel. A more complex embodiment has both an RFID transceiver and an RFID tag IC provided in each patch panel. In such an embodiment, the transceiver in one patch panel waits for a response from another patch panel before it reports on the establishment of a connection. Since both transceivers would be inserting a common-mode signal onto the same super-pair, a collision avoidance mechanism must be in place. Many types of collision avoidance mechanisms can be used, including: (a) separating transmitted from received signals via hybrid circuitry; (b) cycling each panel between transmit and receive states in a duty cycle, such that the "receive" time is much longer than the "transmit" time; and/or (c) the use of a "token" request-to-transmit signal, transmitted at a different frequency for each signal, such that whichever panel responds first to this request will transmit a "grant" transmit signal at another frequency to allow the first panel to transmit. In a preferred architecture, both patch panels 38 and 40 are the same to enable an easier installation process.

In either type of system, the signals passed between the patch panels 38 and 40 along the patch cords 42 allow for the connections between the patch panels in the patch field 44 to be mapped and therefore an NMS connected to one or both patch panels is continuously updated with the correct patching information.

In a second cross-connect embodiment, shown in FIG. 4b, a first common-mode signaling node 37 is provided as an RFID transceiver 41 in the first patch panel 38 and a second common-mode signaling node 39 is provided as an RFID tag IC 43 in the outlet jack 46. In this embodiment, active physical layer management is enabled between the first patch panel 38 and the outlet jack 46. In another embodiment the RFID transceiver 41 could be provided in the second patch panel 40, though in this embodiment the cross-connect patch cord location in the first patch panel 38 would not be managed. With the RFID transceiver 41 located in the first patch panel 38, management signals must pass through the patch cord 42 and the second patch panel 40. Therefore, when the RFID tag IC 43 in the outlet jack 46 responds with information such as a physical location, the patch cord location on the second patch panel 40 can be determined. In this embodiment, the network management system (NMS), which is connected to the patch panels as described in further detail below, can manage connections from the first patch panel 38 all the way to the outlet jack 46. In this embodiment, it is assumed that the connectivity between the network switch 48 and the first patch panel 38 does not change, as shown by the dotted line. A third embodiment, shown in FIG. 4c, is a combination of the embodiments shown in FIGS. 4a and 4b and eliminates the need to assume any portions of the link do not change in their connectivity. In all of the embodiments 4a-4c, guidance LEDs may be provided in the patch panels 38 and 40 and controlled by an NMS.

Figure 5A:
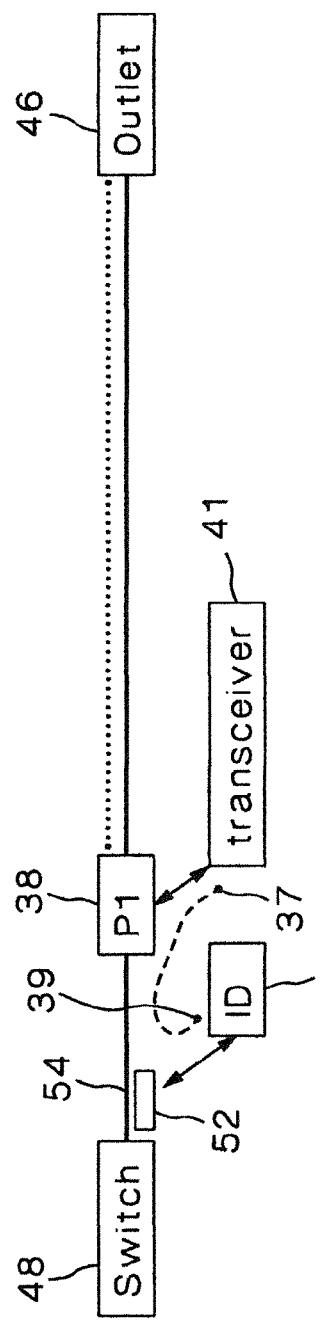
FIGS. 5a-5c are block diagrams of embodiments of the present invention for use with interconnect patch panel deployments.
Figure 5B:
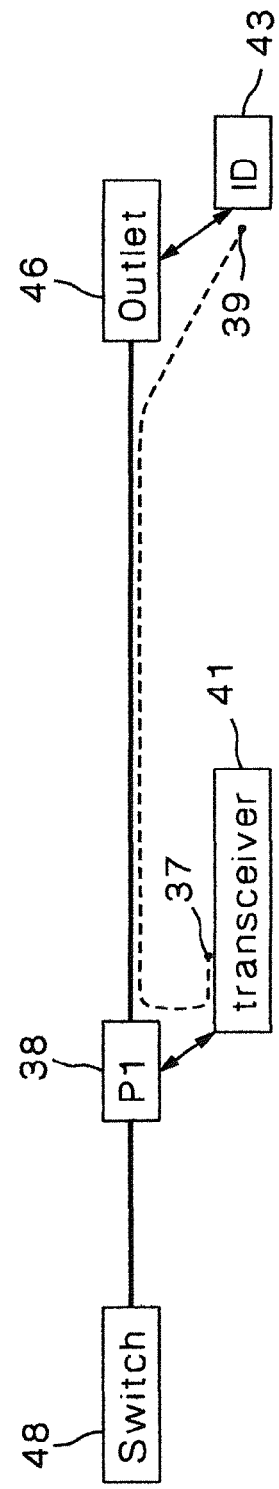
Figure 5C:
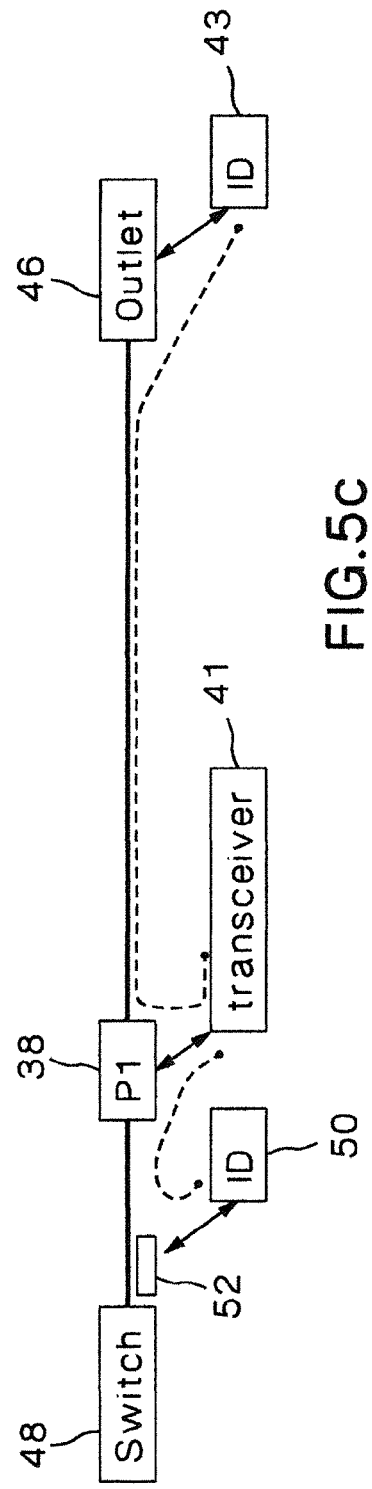

FIGS. 5a-5c show three interconnect embodiments of the present invention. In the interconnect embodiments, only one patch panel 38 is provided in the network pathway between the network switch 48 and the outlet jack 46. In a first interconnect embodiment, shown in FIG. 5a, a first common-mode signaling node 37 is provided as an RFID transceiver 41 in the patch panel 38. A second common-mode signaling node 39 is provided as an RFID tag IC 50 within a mounting bar 52 installed on the network switch 48. A specialized patch cord 54 having an RFID antenna provided in its switch plug is connected between the network switch 48 and the patch panel 38. As shown by the dotted line, the connection between the patch panel 38 and the outlet jack 46 is assumed to be stationary in this embodiment.

In the embodiment shown in FIG. 5a, the RFID tag IC 50 provided on the mounting bar 52 does not require external power; it derives its power through the signal that communicates with it over the patch cord 54. The RFID tag IC 50 contains a unique identification code that serves as a proxy for the switch port that it is installed next to. Using this proxy relationship, an NMS, which can be connected to the patch panel 38, can determine the connectivity between ports on the network switch 48 and ports of the patch panel 38.

FIG. 5b shows a second interconnect embodiment, in which first and second common-mode signaling nodes 37 and 39 are implemented as, respectively, an RFID transceiver 41 provided in the first patch panel 38 and an RFID tag IC 43 provided in the outlet jack 46. A third interconnect embodiment, shown in FIG. 5c, combines the features of the first and second interconnect embodiments, shown in FIGS. 5a and 5b.

In alternative embodiments of FIGS. 4b, 4c, 5b, and 5c, the outlet jack contains an antenna which is connected via common mode to two wire pairs in the jack, and an RFID tag ID is mounted on the outlet adjacent to the antenna. In this embodiment, a jack can be replaced, without impairing the identification of the outlet. Such an embodiment is described in more detail below with reference to FIG. 6a.

The same design can be utilized in other components in a network infrastructure such as a jack in a zone patch panel to document various portions of the network. A unique series of ID codes is assigned to components located in similar parts of the network.

Figure 6:
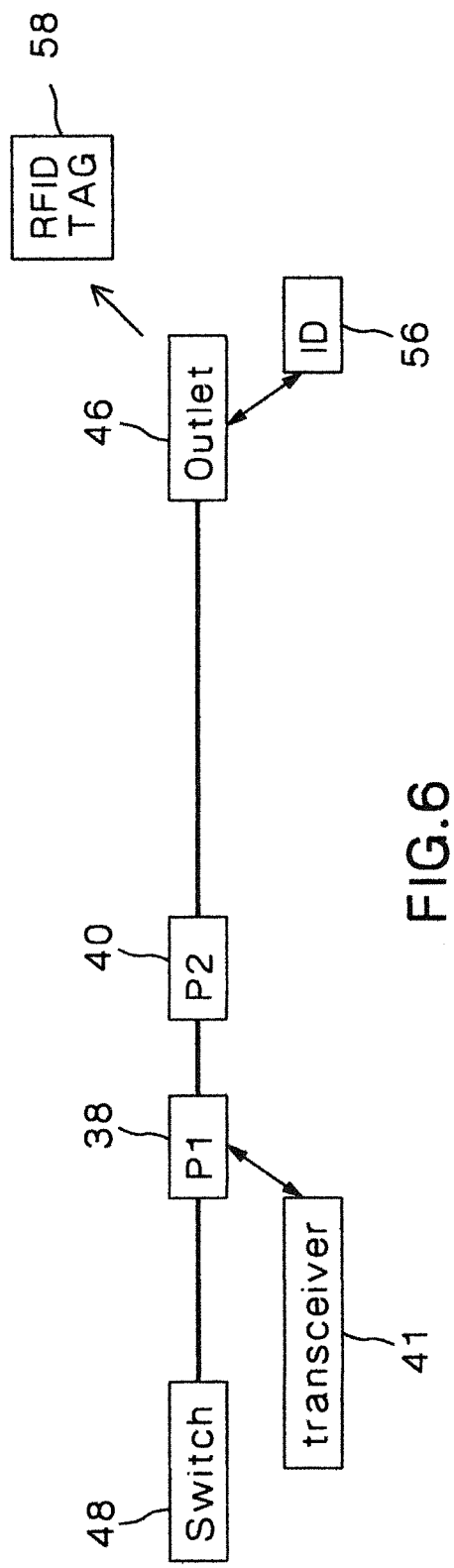
FIG. 6 is a block diagram of an embodiment of the present invention in which an RFID tag external to an outlet can be detected and read.

FIG. 6 shows an embodiment of the present invention that makes use of the common-mode signaling and RFID functionality to enable additional services for users of the network via an NMS system. In this embodiment, an RFID reader 56 is integrated into an outlet jack 46 and is adapted to communicate with RFID tags 58 that can be carried by users. In one embodiment, the RFID tag 58 is packaged into a credit card-sized object that is carried by a user. Several services can be enabled by the embodiment of FIG. 6. For example, Ethernet jack access authorization can be performed under direct control of the outlet 46. Using this system, access to the network through the outlet 46 is authorized only when the RFID tag 58 near the outlet indicates that the user is authorized.

Outlet provisioning and maintenance of outlet ID information can also be enabled in a system as shown in FIG. 6. Using these functions, the RFID tag 58 can be used to initialize the outlet 46 during outlet installation, and communication between the RFID reader 56 and the RFID tag 58 can be used to confirm that information in both of the RFID modules is valid.

A system according to FIG. 6 can also enable authorization of services under control of an NMS, such as door access, light control, heat control, inventory monitoring, and the like. Using these features, a user can change the lighting or heating settings in a particular area, or the outlet 46 can be used to monitor RFID-enabled equipment that comes in close proximity to the outlet 46.

The system of FIG. 6 can also be used to enable communication between an outlet 46 and sensors provided with RFID tag ICs that are external to the outlet but mounted close enough to the outlet 46 to establish RFID communication. Sensors such as temperature, humidity, and air speed sensors can be placed wherever information about a location is desired. The outlet 46 can be adapted to read information from the sensors and provide that information to an NMS.

Figure 6A:
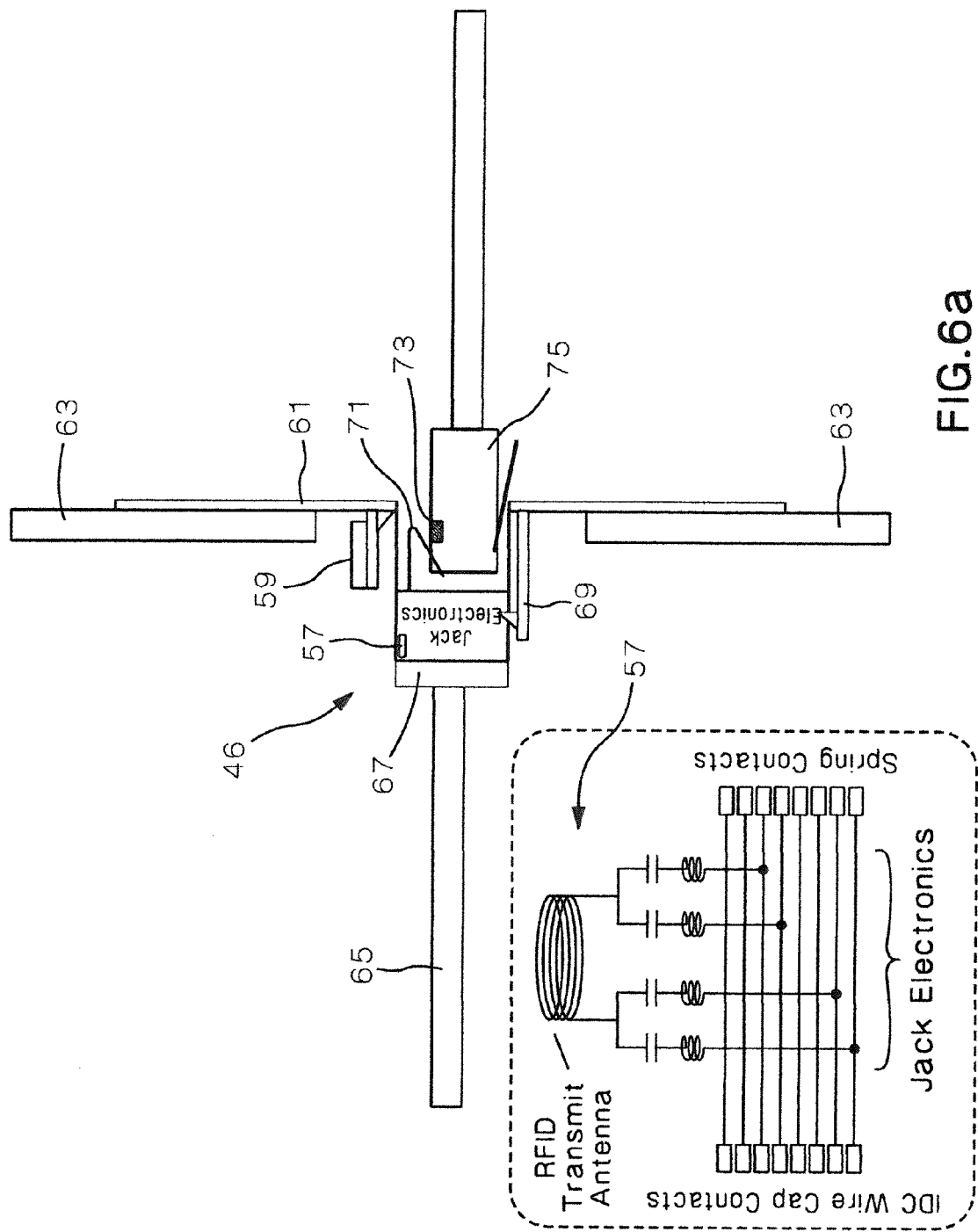
FIG. 6a is an illustration of another embodiment of the system shown in FIG. 6.

In an alternative embodiment of FIG. 6, an RFID tag ID is added to the outlet adjacent to the jack antenna. Such an embodiment is shown in FIG. 6a, which shows an outlet jack provided with jack electronics that include an RFID antenna 57 that is adapted to communicate with an RFID tag ID 59 that is provided in a faceplate 61 mounted to the wall 63. Horizontal cabling 65 is terminated at the outlet jack 46 using a wire cap 67. The outlet jack 46 is held to the faceplate 61 by an outlet jack latch 69. Spring contacts 71 of the jack are adapted to make electrical contact with plug contacts 73 of the plug 75, which may be a plug of a patch cord for attachment to an end user device such as a computer or VOIP phone. While the embodiment of FIG. 6a uses an RFID tag ID 59 provided in the faceplate 61, it is to be understood that similar embodiments may have the RFID tag ID 59 in another location, as long as communication with the RFID antenna 57 can be maintained.

Figure 7:
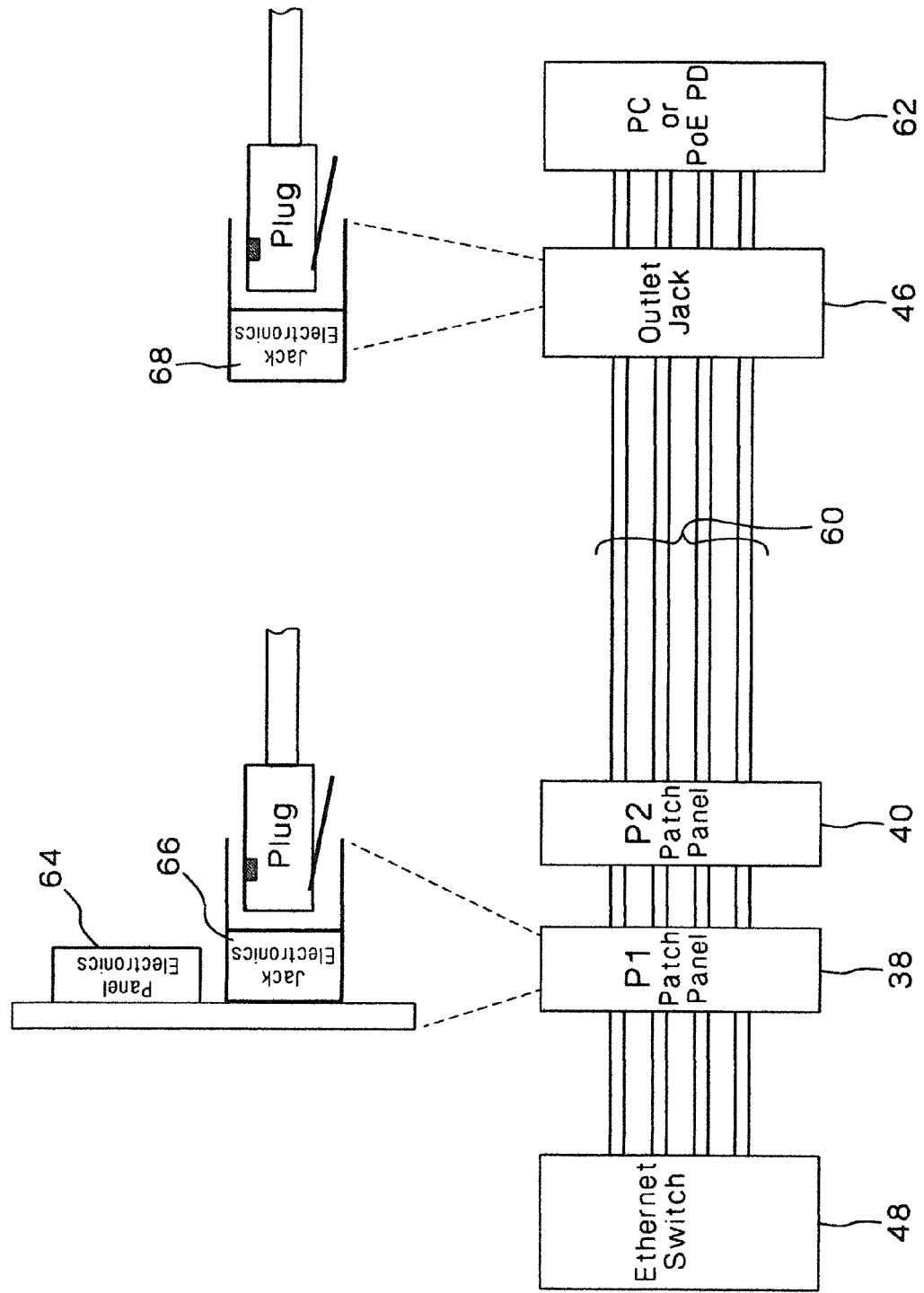
FIG. 7 is a more detailed block diagram of a cross-connect embodiment of the present invention.

FIG. 7 illustrates in greater detail a cross-connect embodiment of the present invention, similar to the arrangement shown in FIG. 4b. Four wire pairs 60 are illustrated in a communication link between the network switch 48 and an outlet jack 46. An end-user device 62 such as a PC or a power-over-Ethernet powered device is connected to the outlet jack 46. The RFID transceiver 41 as shown in FIG. 4b can be implemented in panel electronics 64 and/or jack electronics 66 of the patch panel 38. Similarly, the RFID tag IC 43 installed at the outlet 46 as shown in FIG. 4b can be provided within jack electronics 68 of the outlet jack 46.

Figure 8:
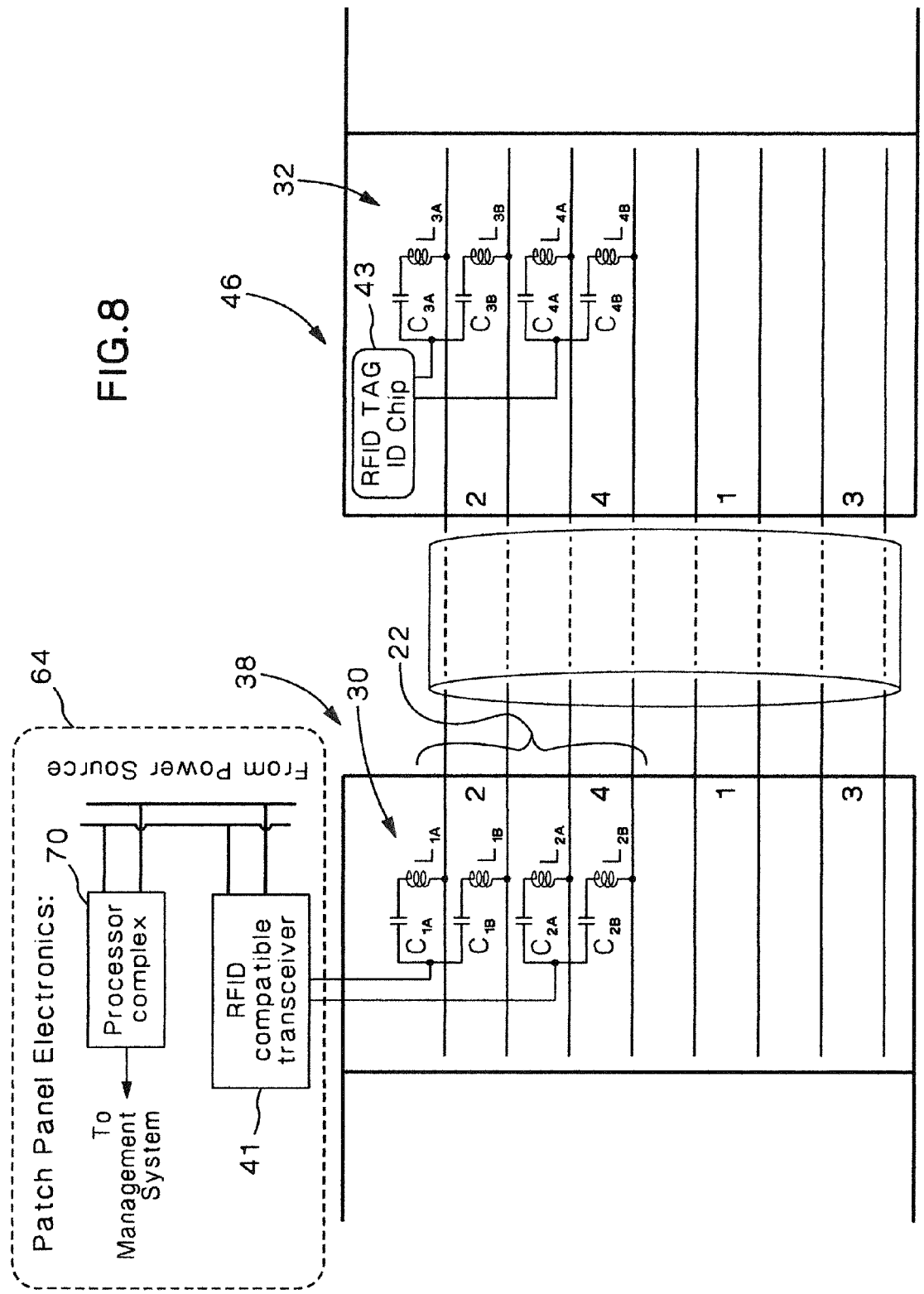
FIG. 8 is a schematic diagram showing electrical connections that allow systems according to the present invention to communicate with an RFID tag in an outlet jack.

FIG. 8 shows the electronics that enable an RFID transceiver provided within a patch panel 38 of the present invention to communicate with an RFID tag IC 43 provided within an outlet jack 46. Common mode coupling circuitry 30 and 32 is provided within the patch panel 38 and the outlet jack 46, respectively. The coupling circuitry on each wire pair forms high impedance to the differential-mode signal propagating on the pair, which reduces loading effects on the differential-mode signal. Low impedance is provided for the common-mode signal that is transmitted along the super-pair 22. Each combination of inductors and capacitors as shown forms a series resonant circuit (for example $L_{1A}$ & $L_{1B}$ and $C_{1A}$ & $C_{1B}$) having a minimum impedance (occurring at the resonant frequency) that is designed to be the common-mode communication frequency between the patch panel 38 and the RFID tag IC 43 within the outlet jack 46. It is preferred that these components reside on an RJ45 jack circuit board due to the high frequencies that the differential-mode signal contains. This arrangement keeps the high frequencies on the RJ45 jack printed circuit board, minimizes the additional pin-outs required on the PCB-style RJ45 jack, and reduces parasitic coupling to other wires.

At the outlet jack 46, in addition to the common-mode coupling circuitry 32, only an RFID tag IC 43 is required. Rather than using a receive antenna, which would be used in a typical RFID application, the output of the common-mode circuitry is directly attached to the RFID tag IC 43. Thus, the RFID tag IC 43 is capable of communicating directly over the wires forming the super-pair 22. Similarly, on the side of the RFID reader or transceiver 41, instead of transmitting the RFID signal via an antenna, the transceiver 41 is directly attached to the input of the common-mode coupling circuitry 30 of the patch panel 38. The panel electronics 64 of the patch panel 38 include a processor 70 that is capable of communicating with an NMS to facilitate physical layer management features.

The RFID tag IC 43 of the outlet jack 46 can contain several different types of information. Examples of information that can be contained in the RFID tag IC 43 include: (a) an identification or serial number; (b) the dates of installation and permanent link testing; (c) the physical location of the outlet jack 46 and optionally the patch panel that it is connected to; (d) Ethernet access priority (e.g., high, medium, or low) which reflects the relative importance of the jack in terms of its access to the network switch; and (e) whether or not the outlet jack has power over Ethernet supplied via a midspan or endspan power supply device. According to one embodiment, the RFID tag IC 43 requires no external power; it derives its power from the common-mode communication signal.

Figure 9:
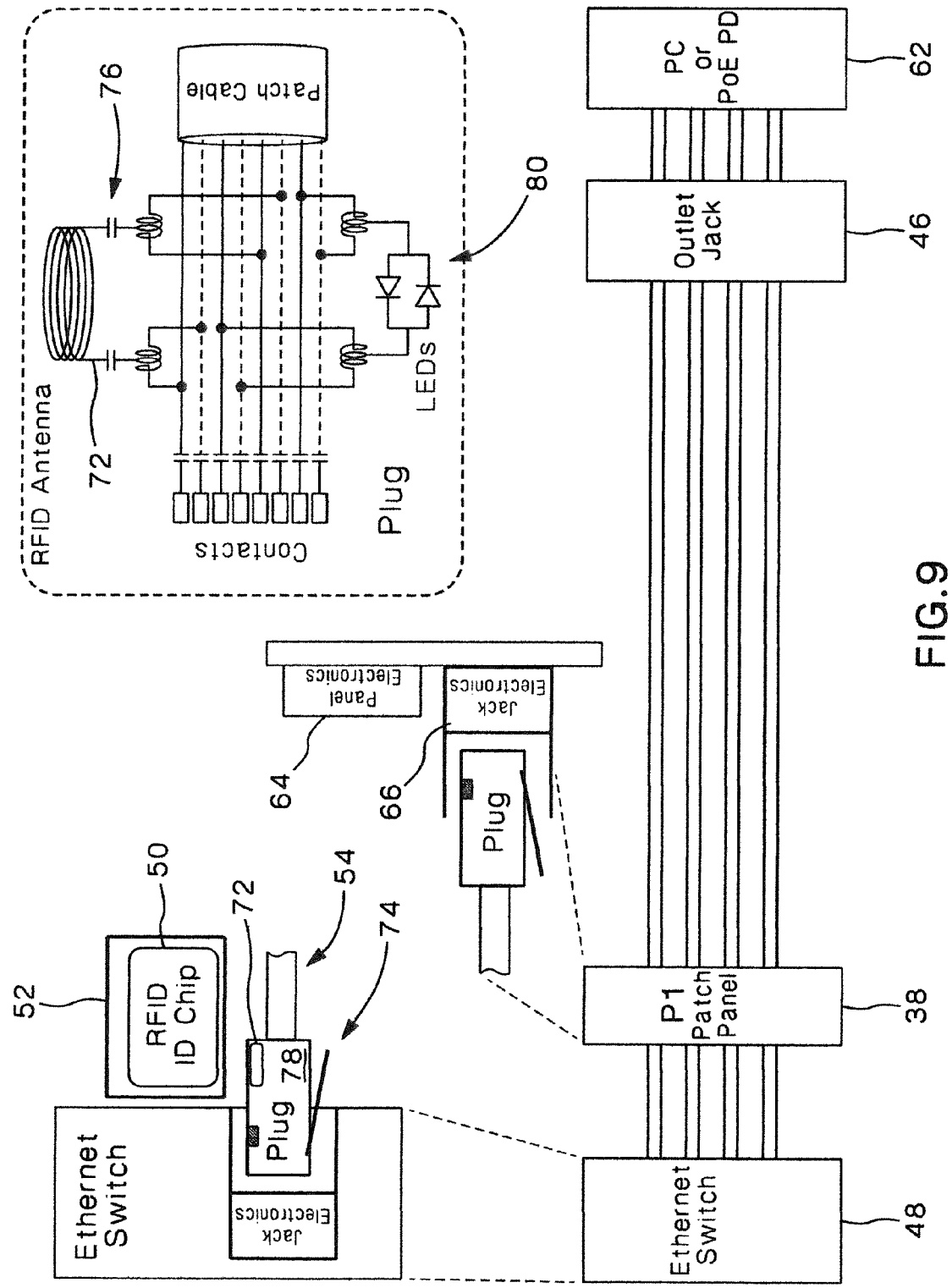
FIG. 9 is a more detailed block diagram of an interconnect embodiment of the present invention.

FIG. 9 shows in greater detail the location of electronic components in an interconnect embodiment of the present invention, such as the embodiment shown in FIG. 5a. A mounting bar 52 (shown in greater detail in FIGS. 10a-10c) holds RFID chips 50 that are associated with each individual port 74 of the network switch 48. An RFID antenna 72 provided within a plug 78 of a specialized patch cord 54 is connected to common mode coupling circuitry 76, as shown in the detail view of FIG. 9. The RFID antenna 72 communicates wirelessly with the RFID tag IC 50 associated with the switch port 74 into which the plug 78 is plugged. LEDs 80 may also be provided within the plug 78 to aid in guiding a technician during moves, additions, or changes of patch cord connections. The LEDs 80 can be controlled, for example, by a DC voltage applied in common mode onto the alternate super-pair (i.e., the super-pair not being used for communicating with the RFID antenna 72).

Figure 10A:
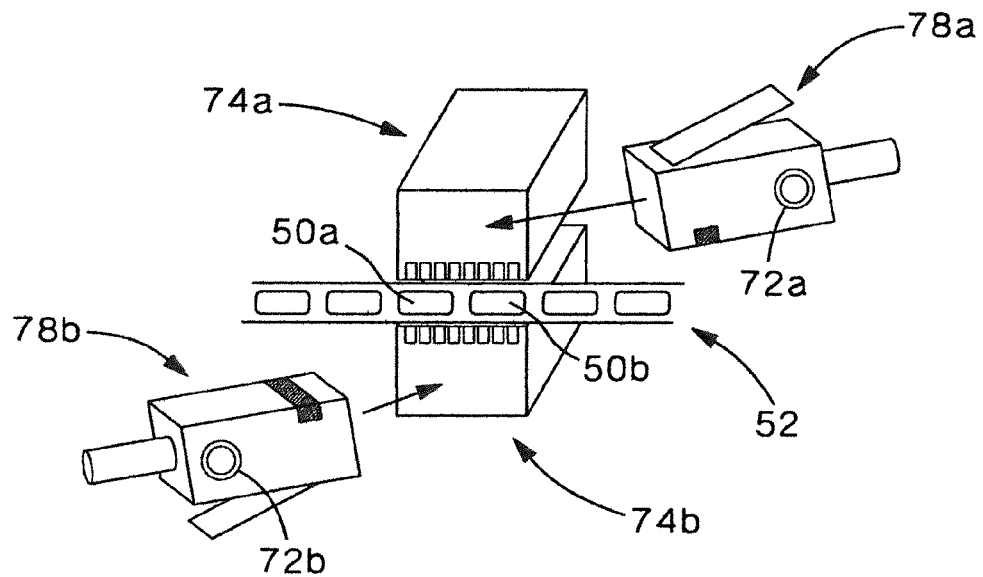
FIGS. 10a-10c show RFID mounting bars for use with network switches according to some embodiments of the present invention.
Figure 10B:
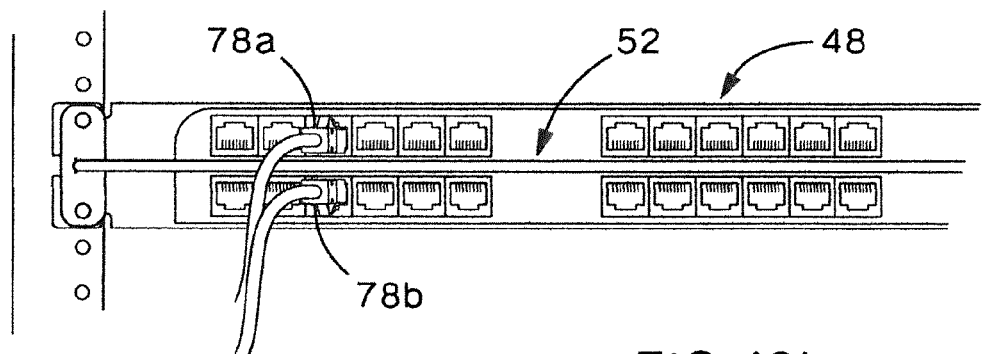
Figure 10C:
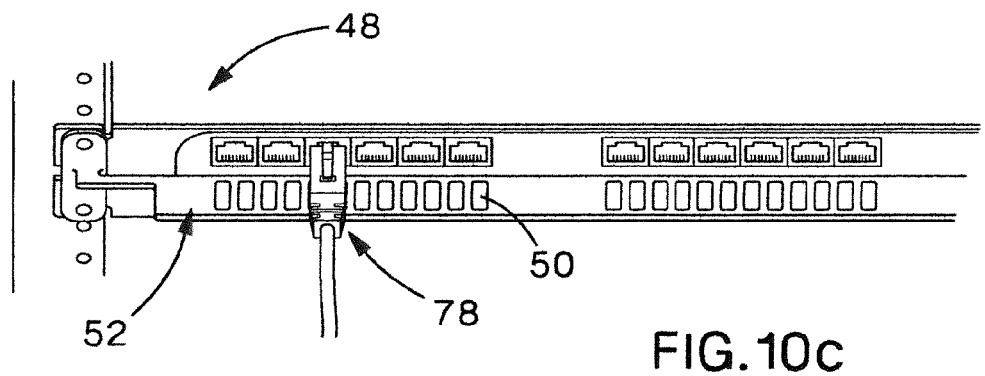

FIGS. 10a-10c show a mounting bar 52 mounted on the face of an Ethernet switch 48. The mounting bar 52 is provided with a number of RFID tag IC's 50, with each RFID tag IC 50 corresponding to one of the switch ports 74. As shown in FIG. 10a, an RFID tag 50a is associated with the top switch port 74a and is adapted to wirelessly communicate with the RFID antenna 72a when the plug 78a is plugged into the top port 74a. Similarly, a second RFID tag 50b is associated with the bottom switch port 74b and is adapted to wirelessly communicate with the RFID antenna 72b when the plug 78b is plugged into the bottom port 74b. Each RFID tag IC 50 contains identifying information and serves as a proxy for the switch port with which it is associated. Using the communication between the RFID antennas 72 and the RFID tag ICs 50, an NMS can determine the connectivity between switch ports 74 and patch panel ports. As shown in FIGS. 10b and 10c, the mounting bar 52 is preferably mounted between top and bottom arrays of switch ports 78 on the face of the network switch 48.

Figure 11:
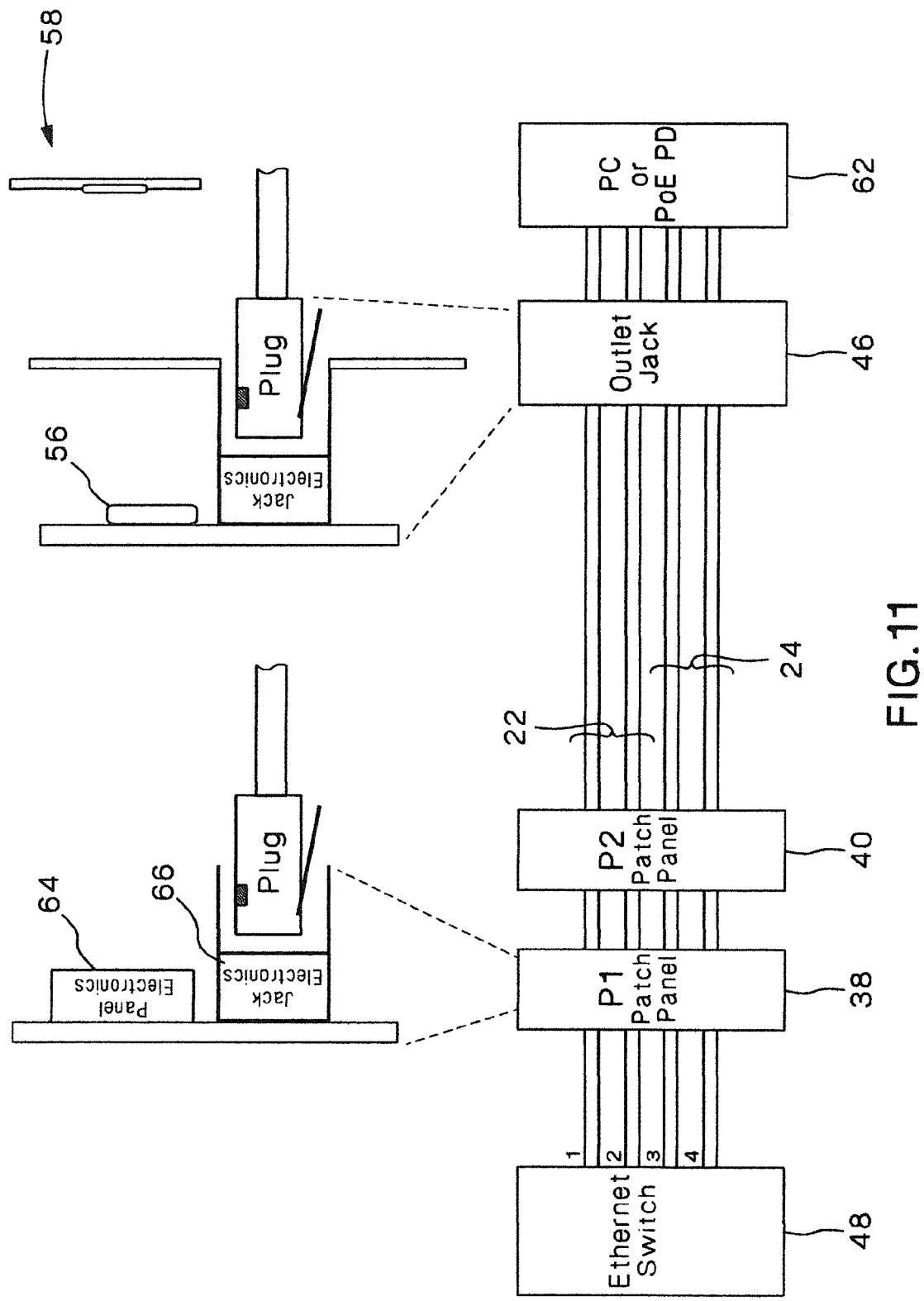
FIG. 11 is a block diagram of an embodiment of the present invention in which a communication outlet is equipped to communicate with an external RFID tag.

FIG. 11 shows a more detailed view of the embodiment shown in FIG. 6, in which an RFID tag 58 that can be carried by a user communicates with an RFID reader 56 that is provided at the outlet jack 46. In this embodiment, a first super-pair 22 in the communication link between the first patch panel 38 and the outlet jack 46 can be used to communicate with an RFID tag IC that can be provided in the outlet jack 46, and a second super-pair 24 can be used to communicate with the RFID reader 56. Communication with the RFID tag IC of the outlet and the RFID reader 56 takes place using common-mode signaling over standard Ethernet cabling, without having a negative effect on standard differential-mode Ethernet signaling. As discussed above, the RFID tag 58 can be used for a number of purposes, including detecting user presence, changing lighting and heating or cooling levels to meet user preferences, or controlling network access based on the level of access that the user is authorized to use.

In all of the systems according to the present invention, specialized patch cords may be provided with LEDs in their plugs in order to enable guidance instructions to be visually indicated to technicians. Further, LEDs may be provided next to patch panel ports for the same purpose.

Intelligent patching and RFID reading systems of the present invention provide a number of functions and benefits. They can guide moves, adds, and changes of patch cords. They can provide an administrator with real-time information regarding network status and monitor connectivity of patch cords. They can map patch fields and facilitate planning, implementation, and documentation of connectivity installations and removals. Further, the systems monitor patch field changes and alert administrators of any patch field changes or potential security risks, for example by communication with an NMS. A web-based management system may be used to allow access to the functions of the systems, and to interface with third-party network management systems, help desk applications, and other enterprise systems.

The invention claimed is:

1. A physical layer management system for an Ethernet system utilizing patch cords, each patch cord having a connector on each end and containing four pairs of conductors comprising:
    a first Ethernet outlet, the first Ethernet outlet comprising an radio frequency identification (RFID) transceiver configured to receive and transmit signals over at least one super-pair of conductors of the patch-cord via antennas located on the connectors; and
    a second Ethernet outlet, the second Ethernet outlet comprising an RFID tag integrated circuit (IC) configured to send and receive signals over at least one super-pair of conductors of the patch-cord via antennas located on the connectors, wherein a super-pair is defined as two twisted-pairs of conductors of the patch cord, each twisted-pair being a twisted-pair normally used in a differential-mode manner in Ethernet signal communications and further wherein the two twisted pairs of the super-pair are used in a common-mode manner in order to form a super-pair.

2. The system of claim 1 wherein the first Ethernet outlet further comprises an RFID tag IC and the second Ethernet outlet further comprises an RFID transceiver.

3. The system of claim 2 further comprising circuitry configured to implement a collision avoidance mechanism.

4. The system of claim 3 wherein the collision avoidance mechanism comprises separating transmitted signals from received signals via hybrid circuitry.

5. The system of claim 3 wherein the collision avoidance mechanism comprises cycling each Ethernet outlet between transmit and receive states in a duty cycle.

6. The system of claim 3 wherein the collision avoidance mechanism comprises the use of a request-to-transmit signal.

7. The system of claim 1 wherein the first Ethernet outlet and the second Ethernet outlet are contained within one or more patch panels.

8. The system of claim 1 wherein the first Ethernet outlet is contained within a patch panel and the second Ethernet outlet is an outlet jack.

9. The system of claim 1 wherein the first Ethernet outlet is contained within a patch panel and the second Ethernet outlet is contained within a network switch.

10. The system of claim 9 wherein the RFID tag IC is contained within a mounting bar mounted on the network switch.

11. The system of claim 8 wherein the outlet jack further comprises an RFID antenna and the MD tag IC is mounted on the outlet jack proximate to the antenna.

12. The system of claim 8 wherein the RFID tag IC is contained within a faceplate mounted to a wall of the outlet jack.

13. The system of claim 1 wherein the RFID transceiver is contained within circuitry located within a jack associated with the first Ethernet outlet.

14. The system of claim 2 wherein the RFID transceiver is contained within electronics located inside the patch panel associated with the First Ethernet outlet.

15. The system of claim 1 further comprising common mode coupling circuitry located within jacks associated with at least one of the first Ethernet outlet and the second Ethernet outlet, the common mode coupling circuitry configured to have a minimum impedance at a communication frequency to be used by the RFID transceiver and the RFID tag IC, at least one of the RFID tag IC and RFID transceiver being electrically connected to the at least one super-pair of the patch cord via the common mode coupling circuitry.

* * * * *